United States Patent [19]

Takahashi et al.

[11] 4,135,149

[45] Jan. 16, 1979

[54] INDICATION INPUT SIGNAL PROCESSING SYSTEM FOR USE IN REMOTE SUPERVISORY CONTROL APPARATUS

[75] Inventors: Masahiro Takahashi; Masao Yanaka, both of Hitachi, Japan

[73] Assignee: Hitachi, Ltd., Japan

[21] Appl. No.: 784,423

[22] Filed: Apr. 4, 1977

[30] Foreign Application Priority Data

Apr. 7, 1976 [JP] Japan .................................. 51-38218

[51] Int. Cl.² .............................................. H04Q 9/00
[52] U.S. Cl. .......................... 340/147 R; 340/147 SY; 340/147 A
[58] Field of Search .................... 340/147 SY, , 147 R, 340/147 A, 151

[56] References Cited

U.S. PATENT DOCUMENTS

| | | | |
|---|---|---|---|
| 3,405,393 | 10/1968 | Haselwood | 340/147 SY |
| 3,564,499 | 2/1971 | Ryan | 340/147 R |
| 3,716,697 | 2/1973 | Weir | 340/147 A |

*Primary Examiner*—Harold I. Pitts

*Attorney, Agent, or Firm*—Craig & Antonelli

[57] ABSTRACT

Various machines and apparatus equipped in an unattendet remote controlled station are associated with contact means through which the remote supervisory control for the operation of these machines and apparatus is carried out to a master station. Contact information provided by the individual contact means is assigned with an indication input type determined by a setting circuit provided for each of the indication input types. The contact information assigned any one of indication input types is stored in a memory circuit having a predetermined memory and holding function which is provided for each of the indication input types. Outputs from the memory circuits are ORed and thereafter converted into a predetermined transmission format, which is transmitted to the master station, thus completing an indication input signal processing. A predetermined number of the contact information is ganged into groups and all of the above-mentioned processes are carried out by processing the groups on a time division basis.

7 Claims, 4 Drawing Figures

INDICATION INPUT SIGNAL PROCESSING SYSTEM FOR USE IN REMOTE SUPERVISORY CONTROL APPARATUS

BACKGROUND OF THE INVENTION

1. Field of the Invention

The present invention relates to an indication input signal processing system in a remote controlled station for use in a remote supervisory control apparatus and more particularly, it relates to an indication input signal processing system suitable for a remote controlled station which is constituted by a digital processing unit.

2. Description of the Prior Art

In a remote supervisory control system, for the purpose of supervising or controlling the operation of various machines and apparatus equipped in an unattended remote controlled station such as for example a substation, the operation of the various machines and apparatus is observed in terms of an indication input signal standing for the state of relay contacts, the indication of meters and the like, and this indication input signal is transmitted to a centralized control station, i.e., a master station to energize a corresponding indication lamp on a control panel located in the centralized control station.

In general, the indication type used in a remote supervisory control apparatus is classified into four standard types (for example, reference is made to remote supervisory control apparatus for centralized control itemized in Japan Electric Machine Industry Association Standards) and corresponding thereto, the following three indication input types are available.

Indication type A: a momentary input having a duration of more than 50 ms is memorized in a memory and the memory is reset by an indication reset signal a from a master station;

Indication type B: a momentary input having a duration of more than 50 ms is memorized in a memory and the memory is automatically reset by an indication reset signal b provided from a remote controlled station after the momentary input has been sent by way of a cyclic digital transmission system to the master station with repetition of a predetermined cycle, that is, within a predetermined time period; and Indication type C: an indication signal taken up by an indication input circuit is directly sent to a master station without any reset.

Indication type A is usually applicable to observe the operation of circuit breakers, being tripped or re-closed, and the transmission of the indication reset signal a to the remote controlled station is effected manually after an operator belonging to the master station has checked the indication input signals. In other words, this indication type is employed for relatively highly-weighted important indication input signals which require "check" by the operator. Indication type B is usually applicable to observe an indication input signal representative of an abnormal state of the machine and apparatus equipped in the remote controlled station, which abnormal state is detected by an abnormal detecting relay, for example. This indication input signal from the abnormal relay is sent to the master station with repetition of a predetermined cycle, that is, within a predetermined time period so as to enable indication lamps on the control panel in the master station for a predetermined time period. Then, irrespective of the fact whether or not the lamp indication is checked by the operator, the remote controlled station itself provides a reset signal b by which a memory circuit of the remote controlled station is reset. As will be appreciated from the above description, this indication type B is employed for indication input signals of relatively low-weighted importance which do not require "check" by the operator.

Indication type C is used for observing an indication input signal representative of the state of a switch, for example, wherein such an indication input signal obtained through a relay contact or the like element disposed in the remote controlled station is sent to the master station as it were, without being subjected to reset.

The operation of various machines and apparatus equipped in the remote controlled station is represented in terms of the operation of relay contacts, meter and the like, and as to each of the data signals (referred to hereinafter as position data signals) obtained through the relay contacts, a predetermined one of the three indication types is selected in accordance with a predetermined weight of importance of the operation of and supervision for the machines and apparatus, that is, weight of importance of the position data signal. An indication type selected for (or assigned to) one position data signal is not retained unchangeable permanently but must be exchanged with other indication types in conformity with the alternation of the control mode.

A prior art selection system for selecting one indication type for the indication input signal, that is, position data signal from the remote controlled station, which system corresponds to an indication input signal processing system referred to herein, was constructed as shown in FIGS. 1 and 2.

As shown in FIG. 1, contact information representative of the state of the machines and apparatus is taken up by indication input circuits 50 and 51 through auxiliary relay groups 60 and 61 which are electrically isolated from the machines and apparatus. Namely, the machine and apparatus contact information in terms of the on-off state of the auxiliary relay is taken up by the respective indication input circuits 50 and 51. These indication input circuits 50 and 51 take up input data signals while selecting one of the three indication types as described above. Outputs of the indication input circuits 50 and 51 in the form of indication signal groups each containing 10 position data signals, for example, are taken up by a collection circuit 40 which is well known in the art under the command of a transmission control circuit 20 (instruction route is not shown in the drawing) and then stored in a register 30 temporarily. The indication input signal thus stored temporarily is the converted into a predetermined transmission format, for example, of a cyclic digital transmission type by the transmission control circuit 20, which is well known in the art, and delivered from the transmission control circuit in the form of a serial signal. This output signal is modulated by a transmission unit 10 which is also well known in the art and transmitted onto a transmission line connected to the master station. One position data signal may be represented by one bit and one word containing 10 bits, for example, may preferably be transmitted.

Specifically, one of the indication input circuits for selecting the type of indication input signal, for example, indication input circuit 50 has a construction as shown in FIG. 2.

Assuming now that the auxiliary relay group 60 has 10 input lines (1, 2, ..., 10) connected with various machines and apparatus in the remote controlled station, the number of auxiliary relays to be interposed in the ten input lines amounts to ten. The indication type of contact information (position data signals) from the respective auxiliary relays is selected and set as to each one of the position data signals as will be described later with reference to FIG. 2. In FIG. 2, memory circuits 501-1 and 501-2 adapted to select the indication type A are set by receiving a momentary input having a duration of more than 50 ms and reset by an indication reset signal a, whereas memory circuits 502-1 502-2 adapted to select the indication type B are set by receiving a momentary input having a duration of more than 50 ms and reset by an indication reset signal b after the content of the memory circuits 502-1 and 502-2 has been sent by way of a cyclic digital transmission system to the master station with repetition of a predetermined cycle, that is, within a predetermined time period. Taking input line 1, for example, one output is selected and delivered from the indication input circuit 50, which output corresponds to either output c from the memory circuit 501-1, output d from the memory circuit 502-1 or output e directly representative of the state of a relay in the auxiliary relay group 60. Specifically, as viewed from FIG. 2, a position data signal fed from the input line 1 is assigned with the indication type B and a position data signal fed from the input line 2 is assigned with the indication type A. Conventionally, the memory circuits 501-1, 501-2 and 502-1, 502-2 are constituted by electromagnetic relays and the selective connection of the output signals c, d and e is effected by means of a mechanical transfer switch or by exchanging fixed connections.

With the prior art system described above, however, the individual memory circuits 501-1, 501-2 and 502-1, 502-2 are provided for each one of the position data signals so that as the number of indication input signal increases, not only is the hardware greatly increased but also the number of relays which are not in use (memory circuits 501-1 and 502-2 in FIG. 2) is also increased, thereby impairing the production of an inexpensive apparatus.

SUMMARY OF THE INVENTION

A main object of the present invention is to provide an indication input signal processing system having an inexpensive indication input signal circuit in a remote controlled station.

To attain the above object, this invention is featured by the provision of setting circuits each for setting an indication type in relation to each one of position data signals and memory circuits each for storing the position data signal in accordance with the selected indication type, wherein the position data signals as outputs from the setting circuits are selectively stored in respective memory circuits under the control of processing means, and by the production of these circuits in the form of highly concentrated IC memories.

DESCRIPTION OF THE PREFERRED EMBODIMENT

Figure 1:
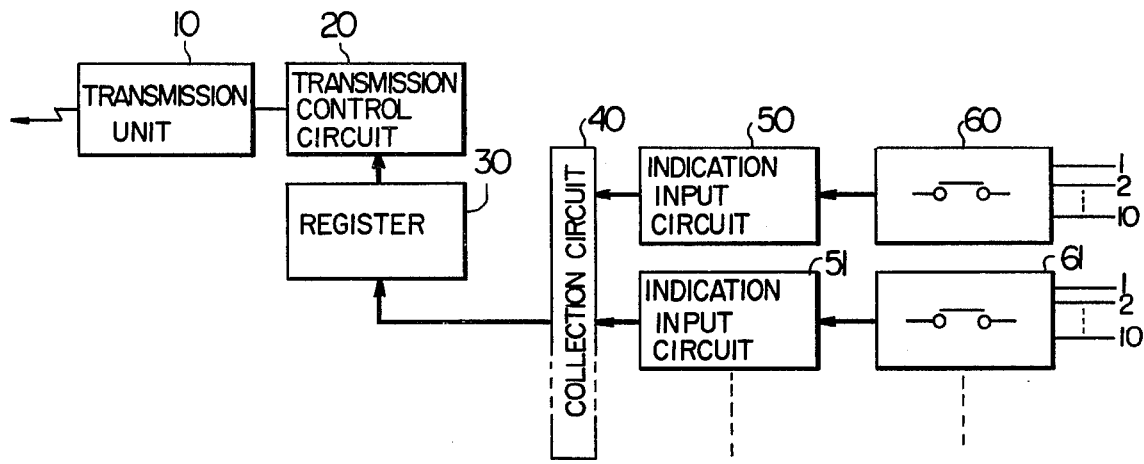
FIG. 1 is a schematic block diagram of a prior art indication input signal processing system.
Figure 2:
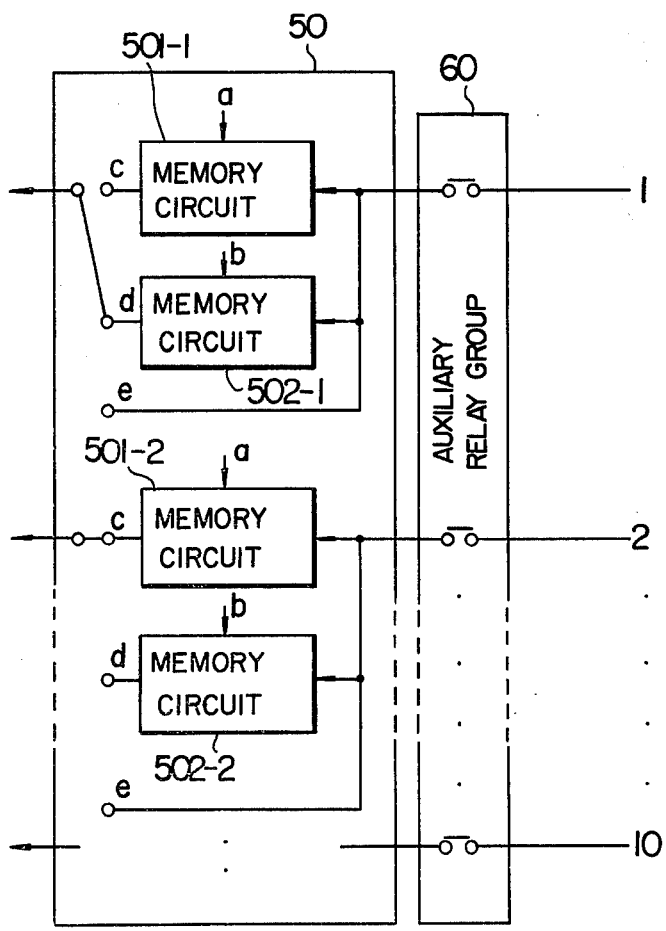
FIG. 2 is a schematic connection diagram of an indication input circuit of FIG. 1.
Figure 3:
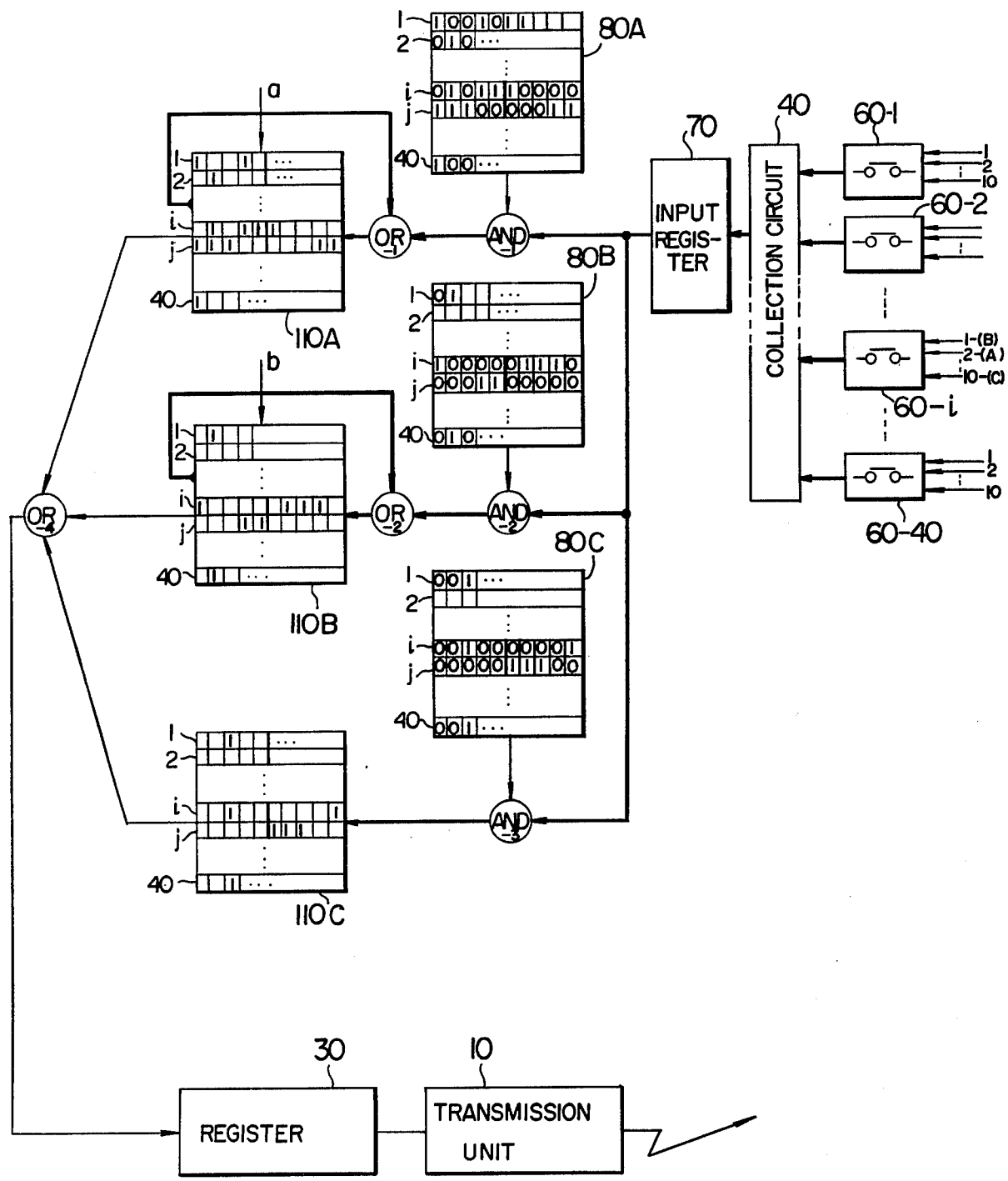
FIG. 3 is a connection diagram showing the principle of an indication input signal processing system embodying this invention.

Before describing an embodiment of the invention, the principle on which an indication input signal processing system of the invention is based will be explained with reference to FIG. 3.

Assume that an unattended remote controlled station such as for example a substation has contact information (position data signal) to be supervised and controlled at a master station which amounts to 400 and 400 indication input signals are to be processed at the remote controlled station such that they are transmitted to the master station to enable indication lamps or the like devices at the master station. The position data signals ganged into groups each containing 10 data signals are fed to 40 auxiliary relay groups 60-1 through 60-40 and the contact information from each of the auxiliary relay groups is taken up by an input register 70 which is well known in the art through a collection circuit 40 also known in the art.

The collection circuit 40 collects position data signals of 400 bits in total on the time division basis in such a manner that the input register 70 receives one after another 10 bit information of 10 position data signals from the auxiliary relay group 60-1, 10 bit information from the auxiliary relay group 60-2, ..., 10 bit information from the auxiliary relay group 60-40 and, again, 10 bit information from the auxiliary relay group 60-1. Setting circuits 80A, 80B and 80C assign each one of the position data signals with indication types A, B and C, respectively. The respective setting circuits may be constituted by a read only memory which is known in the art. As shown in FIG. 3 by way of example, 2nd, 4th, 5th and 6th bits out of 10 bits of auxiliary relay group 60-i are assigned with the indication type A at the setting circuit 80A for indication type A, 1st, 7th, 8th and 9th bits out of 10 bits of the same group are assigned with the indication type B at the setting circuit 80B, and 3rd and 10th bits out of 10 bits of the same group are assigned with the indication type C. Considering that 10 bits of the auxiliary relay group 60-i are delivered successively from the input register 70, the first of 10 bits is ANDed only with an information set in the setting circuit 80B, the second bit is ANDed only with an information set in the setting circuit 80A, and the third and tenth bits are ANDed only with contents set in the setting circuit 80C. Accordingly, it follows that a position data signal connected to the first input line of the auxiliary relay group 60-i is assigned with the indication type B, a second position data signal is assigned with the indication type A and a tenth position data signal is assigned with the indication type C.

Signals ANDed in this manner are fed from AND gates AND-1, AND-2 and AND-3 to memory circuits 110A, 110B and 110C through OR gates OR-1 and OR-2 respectively. The content once stored in the memory circuits 110A and 110B are held therein unless canceled by a reset signal. More particularly, a position data signal sent from the AND gate AND-1 to the memory circuit 110A (for storing only an indication input signal assigned with the indication type A) is ORed with the content stored in a scheduled address of the memory circuit 110A so as to be written again into that address. Accordingly, the content which was previously written in, for example, "1" indicative of an abnormal state is held even if the present input is "0" indicative of the cancellation of the abnormal state. This holds true for the position data signal of indication type B to be taken by the memory circuit 110B. The position data signal of indication type C is directly written into a scheduled address of the memory circuit 110C. In this manner, each one of 400 position data signals is assigned with any one of the three indication types and all of the position data signals assigned with the indication type A, for example, are memorized in scheduled or instructed addresses of the memory circuit 110A. This holds true for the indication types B and C as well.

After being written into the memory circuits 110A, 110B and 110C in accordance with the indication types, the contents fed from the auxiliary relay group 60-1 to respective memory circuits, more generally, fed from the auxiliary relay group 60-i to respective memory circuits are ORed and then transmitted to the master station through the transmission unit 10. All of the contents of the memory circuit 110A are reset by the indication reset signal a from the master station and all of the memorized contents of the memory circuit 110B are reset by the reset signal b after the contents memorized in the memory circuit 110B have been sent to the master station with repetition of a predetermined cycle. This reset signal b may be provided by the trasmission control circuit.

With the above construction, since the contents of the setting circuits 80A, 80B and 80C can previously be determined for assigning each one of the position data signals with an optimum indication type in accordance with weight of importance of a current position data signal and it is sufficient to read then out of the setting circuits, the setting circuits 80A, 80B and 80C may be read only memories. On the other hand, the memory circuits, as obvious from their function, may be constituted by random access memories. The read only memory and the random access memory can be provided in the form of highly concentrated ICs so that the required hardware can be decreased greatly. Further, it is possible to change the indication type easily by simply changing the content stored in the setting circuit.

Figure 4:
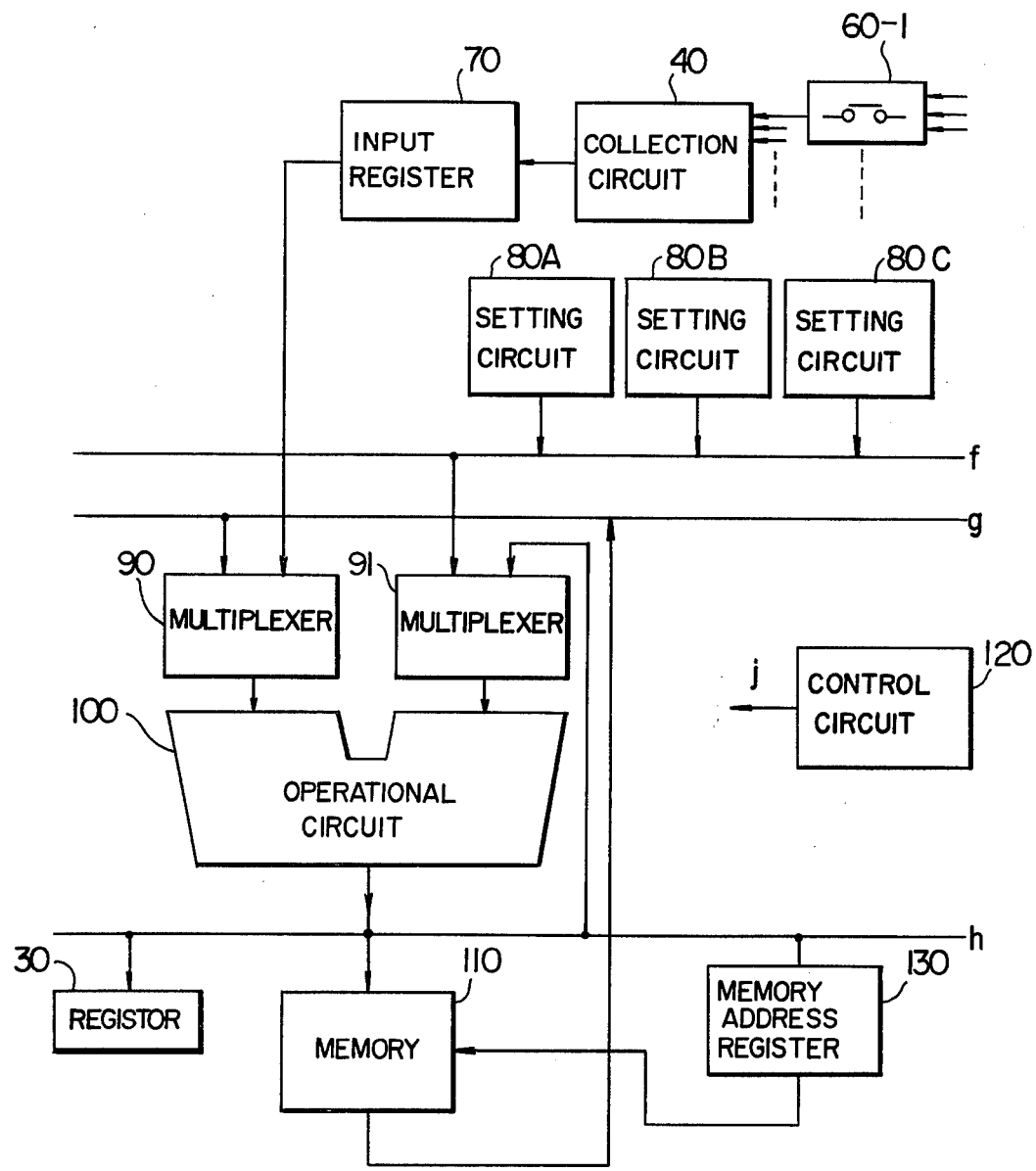
FIG. 4 is a schematic block diagram of an indication input signal processing system embodying this invention.

Turning now to FIG. 4, an indication input circuit in accordance with the present invention will be described hereunder.

As has already been explained with reference to FIG. 3, the position data signals from the auxiliary relay group 60-1, for example, which are ganged into groups each containing 10 position data signals are taken up by the register 70 through the collection circuit 40. It should be noted that since the indication types A and B use the momentary input having a time duration of more than 50 ms, each of the positions states or positions of the machine and apparatus is successively scanned at a rate of less than 50 ms. The setting circuits 80A, 80B and 80C which select the position data signals in accordance with each one of the indication types are connected to a data bus f. Multiplexers 90 and 91 each receiving two inputs select one of the two inputs to deliver it to an operational circuit 100 at which the output data signals from the multiplexers 90 and 91 are processed. The data signals processed by the operational circuit 100 are delivered to a data bus h through a latch register incorporated in the operational circuit 100. A memory 110 including the memory circuits 110A, 110B and 110C stores the data signals from the data bus h and the content of the memory 110 is delivered to a data bus g. A memory address register 130 serves to latch addresses scheduled to be read out of or written into the memory 110 which have been calculated by the operational circuit 100. Thus, the memory 110 is addressed by the output of the memory address register 130. In this circuit arrangement, the output controlling the setting circuits and the controlling of the multiplexers and operational circuit as well as the controlling of writing and reading operations of the memory are carried out under the command of a signal j from a control circuit 120. The control circuit 120 may be composed of memories for storing micro-programs and decoders, where the contents of the micro-programs sequentially read out from the memories are decoded thereby to produce the control signal j. Such a control circuit is known in its composition and operation as disclosed in the following publication; "Micro-Programming Principle and Practice" by Samir S. Husson 1970, Pages 38 to 48, and "High-Performance Microprocessor Architectures" by Bala Parasuraman, Proceedings of the IEEE vol. 64, No. 6, 1976 Pages 851 to 859. The operational circuit 100 also serves to control the transmission of the processed position data signals to the master station. Namely, the position data signals are delivered to an output register 30 for transmission while being controlled by the operational circuit 100.

In operation, where 10 position data signals of the auxiliary relay group 60-i are taken up by the input register 70, they are fed to the operational circuit 100 through the multiplexer 90 and concurrertly therewith, the contents of the setting circuit 80A are taken up by the operational circuit 100 through the multiplexer 91. The position data signal and the content are ANDed at the operational circuit 100 which in turn delivers a resultant output to the data bus h. This output corresponds to the output of the AND gate AND-1 connected to the setting circuit 80A as shown in FIG. 3. This position data signal delivered to the data bus h is set in the multiplexer 91. Then, the corresponding data signal which has already stored in the memory circuit 110A is read out to the bus g and set in the multiplexer 90. Then outputs of the multiplexers 90 and 91 are ORed at the operational circuit 100 and a resultant output is delivered to the data bus h and then stored in the corresponding address of the memory circuit 110A. This operation corresponds to the holding operation described in connection to FIG. 3 that the output from the OR gate OR-1 is stored to the corresponding address of the memory circuit 110A. It will be appreciated that the memory 110 is addressed by an address which has been calculated by the operational circuit 100 and stored in the memory address register 130 through the data bus h. In this manner, the position data signals of the auxiliary relay group 60-i are processed in relation to the indication type A and stored in the memory circuit 110A. The position data signals may be processed in relation to the indication type B in the same manner as the indication type A except that the setting circuit 80B and the memory circuit 110B are utilized.

For the indication type C, the content of the setting circuit 80C and that of the input register 70 are ANDed in the operational circuit 100 and a resultant output is directly stored into the corresponding address of the memory circuit 110C. As has been explained, all contents of the memory circuit 110A for the indication type A are reset by the indication reset signal a from the master station whereas all contents of the memory circuit 110B for the indication type B are automatically reset by the signal b after the contents have been sent to the master station with repetition at a predetermined cycle.

In the next phase, the position data signals stored in the corresponding addresses of memory circuits 110A, 110B and 110C are ORed under the control of the signal j of the control circuit 120.

More particularly, a position data signal stored in an address of the memory circuit 110A associated with the auxiliary relay group 60-i is read out and passed through data bus g, multiplexer 90, operational circuit 100 and data bus h to be set in the multiplexer 91. Thereafter, a position data signal stored in an address of the memory circuit 110B associated with the auxiliary relay group 60-i is read out under the control of signal j and set in the multiplexer 90 through the data bus g. Thus, the data signals set in the two multiplexers are ORed at the operational circuit 100 and a resultant output is set in the multiplexer 91 through the data bus h. Thereafter, the signal j enables a position data signal stored in an address of the memory circuit 110C associated with the auxiliary relay group 60-i to be read out and the readout data signal is set in the multiplexer 90 through the data bus g. Thus, the data signals set in the two multiplexer are ORed at the operational circuit 100 and an ORed result is again processed thereat to be converted into a predetermined transmission format. A serial signal thus obtained is delivered to the transmission unit 10 at which the serial signal is modulated for the transmisson to the master station.

Where, in the embodiment of FIG. 4, the transmission controlling process by means of the operational circuit 100 is carried out in synchronism with the operational process for the indication input circuit, the memory circuit 110 for the indication type C may be omitted such that the operational output is directly transmitted.

According to this invention, as has been explained in the foregoing description, since it is possible that the processing for indication input data signals is effected along with the transmission control processing device on a time division basis, an indication input circuit suitable for the remote controlled station provided by a digital processing unit can be utilized. Further, the setting circuit and the memory circuit may be constituted by inexpensive highly concentrated IC memories, thereby providing an inexpensive and compact indication input circuit.

We claim:

1. An indication input signal processing signal for use in a remote supervisory control apparatus of the type which is remotely supervised and controlled from a master station which receives different types of signal transmission to indicate the operating conditions of various equipment, comprising
    input means for providing a respective indication input signal representing an operating condition of each of various machines and apparatus provided in a remote controlled station;
    first storage means for storing the designated type of signal transmission selectively assigned to each input signal provided by said remote controlled station;
    second storage means including a memory circuit for each different type of signal transmission for storing said indication input signals, the indication input signals being stored in respective memory circuits in accordance with the transmission type assigned thereto as indicated by said first storage means;
    operational circuit means connected to said input means and said first and second storage means for ANDing said indication input signals with the corresponding designations of said first storage means, and for ORing the data stored in said memory circuits in respective operations; and
    output means for transmitting the data stored in said second storage means in accordance with the assigned signal transmission type thereof.

2. An indication input signal processing system as defined in claim 1, wherein said input means includes collection means for time division multiplexing said input signals in a respective manner in groups of the same number of signals as contained in a word of the transmission format.

3. An indication input signal processing system as defined in claim 1, wherein a first memory circuit includes a first memory and means for resetting said first memory in response to a reset signal sent from said master station.

4. An indication input signal processing system as defined in claim 3, wherein a second memory circuit includes a second memory and means for resetting said second memory in response to a reset signal which is provided by the remote controlled station after the data has been transmitted by said output means to said master station.

5. An indication input signal processing system as defined in claim 4, wherein a third memory circuit includes a third memory, the contents of which are not reset during the operation of the system.

6. The system according to claim 5, further including control circuit means for controlling said record storage means wherein data which has already been stored in a predetermined address of said first and second memory circuits and input signals to be addressed to said predetermined address are ORed by said operational circuit means so that the data which has already been stored in said predetermined address is held until canceled by said reset signal.

7. The system according to claim 1, wherein said output means includes means for forming the data into a predetermined cyclic digital transmission format so that the outputs of each one of said memory circuits are ganged into groups and subjected to said OR operation for each one of the groups on a time division basis, and the data is transmitted to the master station after being converted into said predetermined cyclic digital transmission format.

* * * * *